United States Patent
Hamada et al.

(10) Patent No.: US 9,257,684 B2
(45) Date of Patent: Feb. 9, 2016

(54) BATTERY BLOCK AND MANUFACTURING METHOD THEREFOR

(71) Applicant: Panasonic Intellectual Property Management Co., Ltd., Osaka (JP)

(72) Inventors: Hideaki Hamada, Hyogo (JP); Masahiro Ono, Osaka (JP); Tomomi Tanaka, Osaka (JP); Fuminori Takami, Osaka (JP); Yukio Nishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/408,452

(22) PCT Filed: Sep. 3, 2013

(86) PCT No.: PCT/JP2013/005183
§ 371 (c)(1),
(2) Date: Dec. 16, 2014

(87) PCT Pub. No.: WO2014/038175
PCT Pub. Date: Mar. 13, 2014

(65) Prior Publication Data
US 2015/0155529 A1    Jun. 4, 2015

(30) Foreign Application Priority Data

Sep. 4, 2012  (JP) ................................ 2012-193783

(51) Int. Cl.
*H01M 2/02*    (2006.01)
*H01M 2/00*    (2006.01)
(Continued)

(52) U.S. Cl.
CPC ............. *H01M 2/0242* (2013.01); *B23K 26/20* (2013.01); *H01M 2/10* (2013.01); *H01M 2/1077* (2013.01);
(Continued)

(58) Field of Classification Search
None
See application file for complete search history.

(56) References Cited

U.S. PATENT DOCUMENTS 3,321,332 A    5/1967  Vignini
4,546,056 A    10/1985 Jessen et al.
(Continued)

FOREIGN PATENT DOCUMENTS

EP    1 990 860    11/2008
EP    2 738 835    6/2014
(Continued)

OTHER PUBLICATIONS

International Search Report of PCT application No. PCT/JP2013/005183 dated Dec. 3, 2013.
(Continued)

*Primary Examiner* — Cynthia K Walls
(74) *Attorney, Agent, or Firm* — Wenderoth, Lind & Ponack, L.L.P.

(57) ABSTRACT

The purpose of the present invention is to provide a battery block that serves as a member that contains a plurality of battery cells, wherein if abnormal heat generation occurs, the resulting heat is evenly, rapidly, and efficiently distributed throughout the entire block, and the portions in which the battery cells are accommodated have high dimensional precision. The present invention provides a battery block that contains the following: a metal case that contains a plurality of pipe-shaped members; and battery cells accommodated, respectively, in said plurality of pipe-shaped members. The pipe-shaped members are joined to each other, forming a single unit, and join parts that join adjacent pipe-shaped members to each other are at least 70% as long as the pipe-shaped members themselves.

8 Claims, 11 Drawing Sheets

(51) Int. Cl.
*H01M 10/60* (2014.01)
*H01M 2/10* (2006.01)
*H01M 10/625* (2014.01)
*H01M 10/6555* (2014.01)
*H01M 10/643* (2014.01)
*H01M 10/617* (2014.01)
*B23K 26/20* (2014.01)

(52) U.S. Cl.
CPC .......... *H01M 10/617* (2015.04); *H01M 10/625* (2015.04); *H01M 10/643* (2015.04); *H01M 10/6555* (2015.04); *H01M 2220/20* (2013.01)

(56) References Cited

U.S. PATENT DOCUMENTS

| | | | |
|---|---|---|---|
| 4,829,780 A | 5/1989 | Hughes et al. | |
| 4,925,620 A | 5/1990 | Aiello et al. | |
| 6,255,014 B1 * | 7/2001 | Dougherty | H01M 2/043 429/161 |
| 7,332,244 B2 * | 2/2008 | Uemoto | H01M 2/0202 429/149 |
| 8,518,568 B2 * | 8/2013 | Dougherty | H01M 2/1077 429/164 |
| 8,568,915 B2 * | 10/2013 | Fuhr | H01M 2/024 429/158 |
| 2008/0305388 A1 | 12/2008 | Haussman | |
| 2009/0301700 A1 | 12/2009 | German et al. | |
| 2013/0130084 A1 | 5/2013 | Hamada et al. | |

FOREIGN PATENT DOCUMENTS

| | | |
|---|---|---|
| JP | 60-119084 | 6/1985 |
| JP | 61-168215 U | 10/1986 |
| JP | 2-017387 | 1/1990 |
| JP | 2-122299 | 5/1990 |
| JP | 2-256174 | 10/1990 |
| JP | 5-258768 | 10/1993 |
| JP | 11-213976 | 8/1999 |
| JP | 2000-90976 | 3/2000 |
| JP | 2005-302382 | 10/2005 |
| JP | 2007-66773 | 3/2007 |
| JP | 2009-522535 | 6/2009 |
| JP | 2011-255420 | 12/2011 |
| JP | 2 590 241 | 5/2013 |
| WO | 2012/164828 | 12/2012 |

OTHER PUBLICATIONS

Extended European Search Report issued May 6, 2015 in corresponding European Application No. 13834409.8.

* cited by examiner

BATTERY BLOCK AND MANUFACTURING METHOD THEREFOR

TECHNICAL FIELD

The present invention relates to a battery block and a method for manufacturing the same.

BACKGROUND ART

It is generally known in the art to accommodate a plurality of cells in a single container to provide a battery block for use as a high-capacity storage battery for electronic vehicles and other purposes. Examples of such a container known in the art include an assembly of cylindrical metallic tubes welded to one another by spot welding, and an assembly of accommodation hole-containing cases which are surface-joined to one another to form a single unit (see PTL 1). Other examples known in the art include high-temperature storage batteries wherein storage cells are disposed in a predetermined arrangement with adjacent storage cells being partially and mutually joined together via outer cases (see PTLS 2 and 3).

However, since the storage cells suggested in the above-described patent literatures are joined together via outer cases at only several points, heat generated from the cells cannot be diffused and therefore a local temperature rise cannot be easily prevented.

On the other hand, in the future, the market would require higher capacities particularly for storage batteries for electronic vehicles. When secondary cells generated high heat due to increased capacity, it is difficult to allow the heat generated from the secondary cells to be sufficiently absorbed by adjacent cases, and risks that adjacent secondary cells go thermal runaway increase. Thus, there is a growing demand for battery cases for battery blocks which allow for efficient heat diffusion.

CITATION LIST

Patent Literature

PTL 1: Japanese Patent Application Laid-Open No. 2-256174
PTL 2: Japanese Patent Application Laid-Open No. 60-119084
PTL 3: U.S. Pat. No. 4,546,056

SUMMARY OF INVENTION

Technical Problem

For containers for accommodating cells of storage batteries, high dimensional precision is important in portions where cells are accommodated in order to rapidly equalize the cell temperature distribution and to, when abnormal heat generation has occurred in the cell (due for example to short-circuit within the cell), diffuse heat to limit a local temperature rise so that a chain reaction of cell degradation and/or cell abnormality is prevented.

For example, if the dimensional precision is poor in areas where cells are accommodated, there are cases where the accommodated cells vibrate when the storage battery is placed at a place where the cells vibrate. Vibration of the accommodated cells may result in inability of the cells to exert sufficient battery function, accelerated cell degradation, and/or cutting of cell interconnections, thus impairing the performance of the storage battery.

Further, recent demands require a larger capacity for storage batteries. For increased storage battery capacity, a large number of cells need to be accommodated in the container. It is necessary to shorten the cell-to-cell distance in order to accommodate as many cells as possible per unit volume of the container. The internal walls of the container need to be thinner for shortening the cell-to-cell distance. When the internal walls of the container are made thin, it is inevitable that heat cannot be easily diffused, and moreover, the dimensional precision tends to decrease in portions where cells are accommodated.

It is therefore an object of the present invention to provide a battery block that serves as a container accommodating therein a plurality of cells, wherein when abnormal heat generation occurs, heat is equally, rapidly, and efficiently distributed throughout the entire block, and wherein areas in which the cells are accommodated have high dimensional precision.

Solution to Problem

The present invention provides a battery block including: a metallic case including a plurality of pipe-shaped members; and cells respectively accommodated in the plurality of pipe-shaped members. The pipe-shaped members are joined together to form a single unit, wherein a length of a joint between adjacent pipe-shaped members is at least 70% of an entire length of the pipe-shaped members.

The present invention also provides a method for manufacturing a battery block including: providing an assembly of a plurality of pipe-shaped members by holding together the pipe-shaped members while being in direct contact with each other; and providing a metallic case by laser joining of contact surfaces of the pipe-shaped members such that a length of a joint between the pipe-shaped members is at least 70% of an entire length of the pipe-shaped members.

Advantageous Effects of Invention

According to the battery block of the present invention, the metallic case, a container for accommodating cells, has high dimensional precision in portions where cells are accommodated, so that the cell temperature distribution is rapidly equalized. Should abnormal heat generation has occurred in one of the accommodated cells, heat is diffused by passing through the metallic case thus limiting a local temperature rise.

Moreover, since the metallic case advantageously has high dimensional precision in portions where cells are accommodated, vibration of the accommodated cells is limited. For this reason, abnormal heat generation does not occur in adjacent cells and thus a chain reaction of cell degradation and/or cell abnormality is prevented, so that the performance as a storage battery is not impaired.

Thus, a battery block is provided that is also effective as a storage battery to be in an environment where it is susceptible to vibration. A storage battery to be used in an environment where it is susceptible to vibration is for example a storage battery for automobiles.

DESCRIPTION OF EMBODIMENTS

A battery block of the present invention includes a metallic case and a plurality of cells. The metallic case includes a plurality of pipe-shaped members, and the cells are accommodated in the hollow spaces of the pipe-shaped members. The cells included in the battery block have electricity storage ability and therefore the battery block preferably functions as a high-capacity storage battery.

[Battery Block]

Figure 1A:
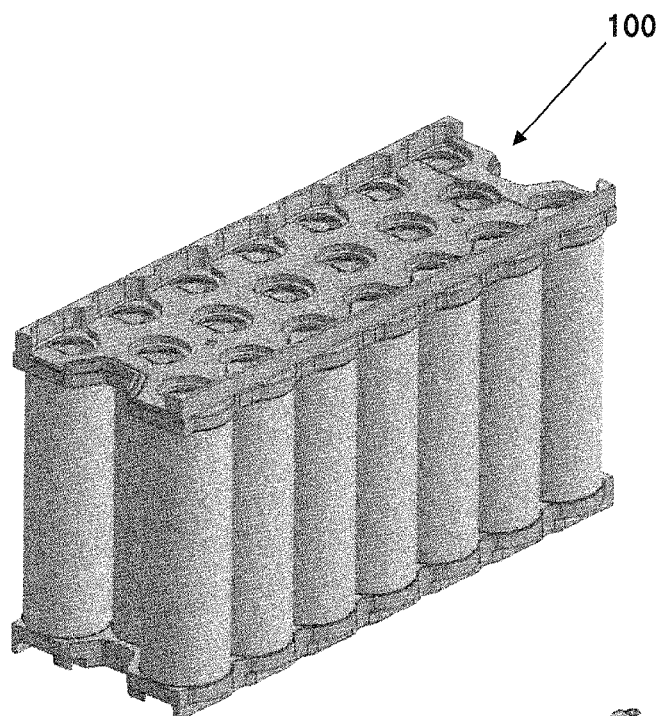
FIG. 1A is a perspective view of a battery block of the present invention.
Figure 1B:
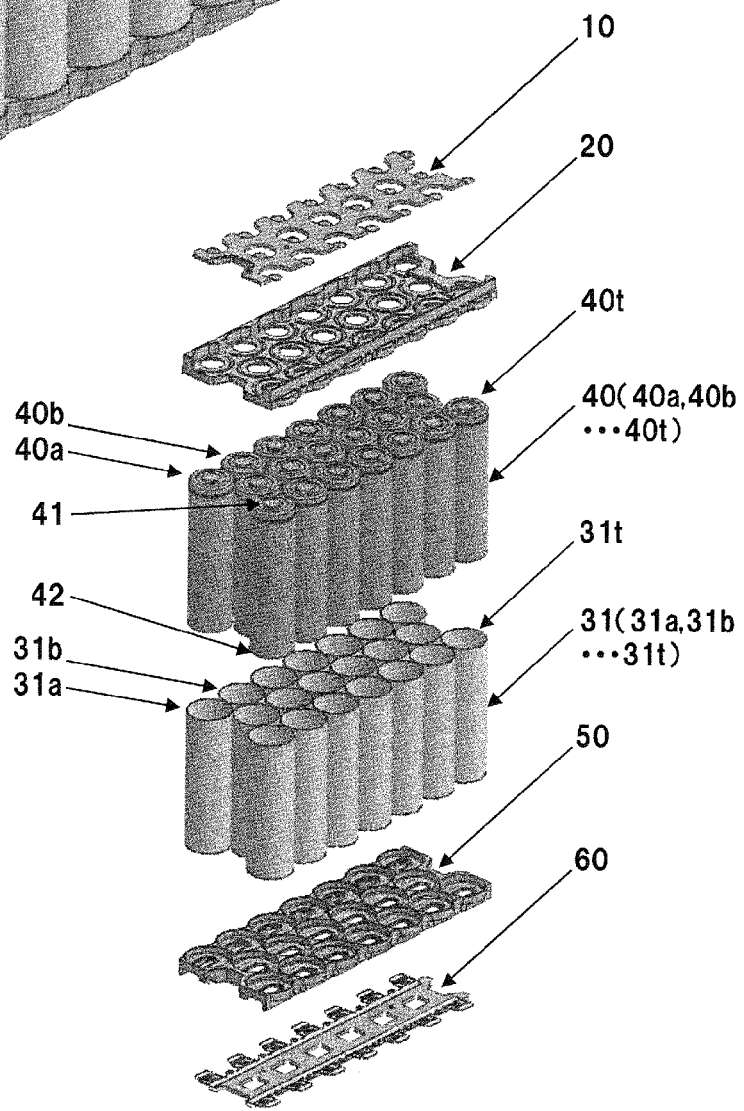
FIG. 1B is an exploded perspective view of a battery block of the present invention.

FIGS. 1A and 1B illustrate an outline of an exemplary battery block of the present invention. FIG. 1A is a perspective view of battery block 100. FIG. 1B is an exploded perspective view of battery block 100. As illustrated in FIG. 1B, battery block 100 includes electrode plate 10, holder 20, a metallic case which is an assembly of pipe-shaped members 31 (31a, 31b ... 31t), a plurality of cells 40 (40a, 40b ... 40t), holder 50, and electrode plate 60.

As illustrated in FIG. 1B, cells 40 (40a, 40b ... 40t) are accommodated in respective corresponding pipe-shaped members 31 (31a, 31b ... 31t). Accommodated cells 40 are supported by holder 20 and holder 50. One electrode 41 of each cell is connected to electrode plate 10 and the other electrode 42 to electrode plate 60. An assembly of a plurality of pipe-shaped members 31 constitutes the "metallic case" of the battery block.

A plurality of pipe-shaped members 31 (31a, 31b ... 31t) constituting the metallic case is an assembly in which the pipe-shaped members 31 are joined together to form a single unit. Specifically, pipe-shaped members 31 (31a, 31b ... 31t) are joined together at their side surface. The assembly of pipe-shaped members 31 included in one battery case may be composed of two or more pipe-shaped members 31. Any number of pipe-shaped members 31 may be provided.

Figure 2A:
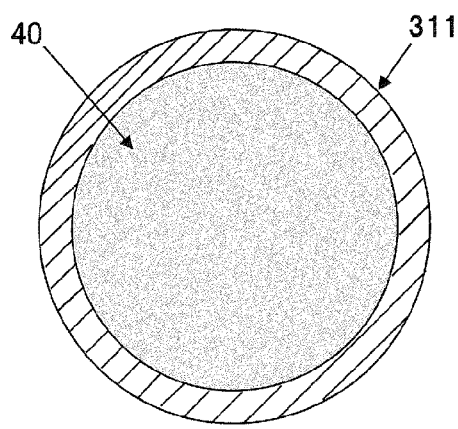
FIGS. 2A to 2D illustrate an example of the shape of a pipe-shaped member.
Figure 2B:
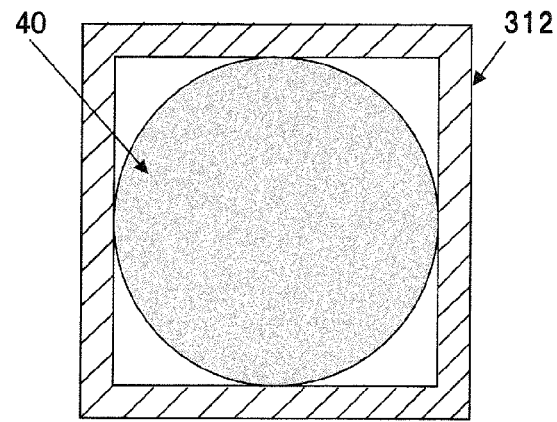
Figure 2C:
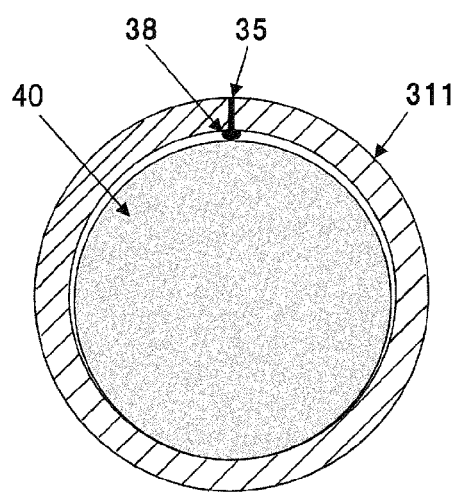
Figure 2D:
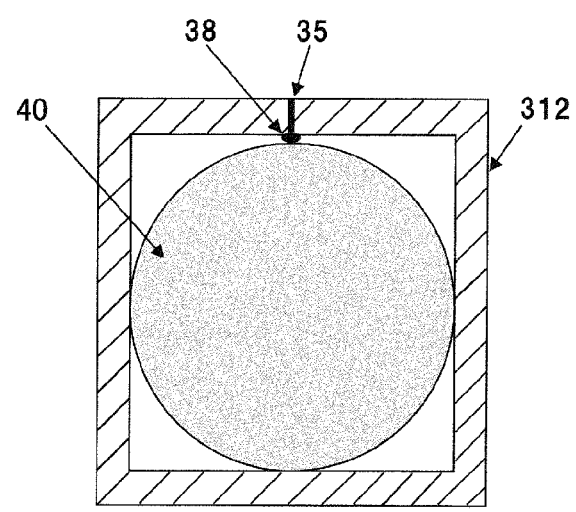

Pipe-shaped member 31 may be circular pipe 311 as illustrated in FIG. 2A or polygonal (e.g., square) pipe 312 as illustrated in FIG. 2B. Alternatively, pipe-shaped member 31 may be circular pipe 311 having mating surfaces 35 as illustrated in FIG. 2C or polygonal (e.g., square) pipe 312 having mating surfaces 35 as illustrated in FIG. 2D.

The inside of pipe-shaped members 31 (31a, 31b, ... 31t) is hollow space extending along the axial direction thereof. Cells 40 (40a, 40b ... 40t) are accommodated in the hollow spaces of pipe-shaped members 31 (31a, 31b ... 31t). Cells 40 (40a, 40b ... 40t) are typically cylindrical.

Figure 3A:
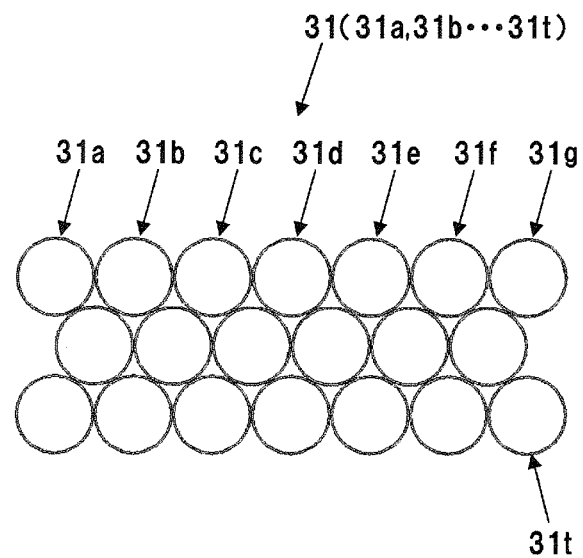
FIGS. 3A and 3B illustrate an arrangement of pipe-shaped members.
Figure 3B:
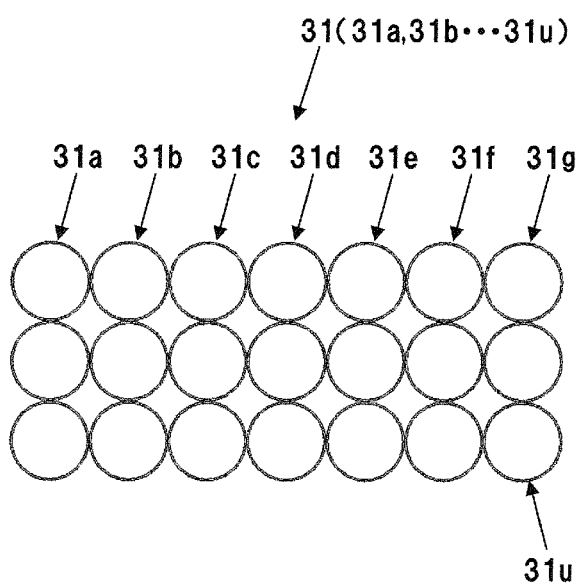

Pipe-shaped members 31 (31a, 31b ... 31t) constituting the metallic case can be provided in any arrangement. For example, when pipe-shaped members 31 (31a, 31b ... 31t) are circular pipes, pipe-shaped members 31 may be provided in a close packing arrangement as illustrated in FIG. 3A. As illustrated in FIG. 3B, pipe-shaped members 31 (31a, 31b ... 31u) may also be provided in a square arrangement.

Pipe-shaped member 31 is preferably made of metal. The metal constituting pipe-shaped member 31 is preferably a metal having high thermal conductivity; specifically, the metal is for example aluminum, copper, brass, stainless steel, or an alloy thereof. Aluminum is preferable from the perspective of light-weightness of pipe-shaped member 31.

The thickness of a plate constituting pipe-shaped member 31 is preferably on the order of 0.2 mm to 1 mm, and is for example 0.4 mm. The metallic case is advantageously made more light weight with smaller plate thickness. However, when the plate is excessively thin, it results in failure to attain strength high enough for the metallic case to serve as a metallic case for the battery block.

The size of the hollow space in pipe-shaped member 31 is determined according to the size of cell 40 to be accommodated in the hollow space. Specifically, the diameter of a cross section of the hollow space is preferably somewhat larger than the diameter of a cross section of cell 40 to be accommodated in the hollow space, in order for the cell to be accommodated in the hollow space. The difference (clearance) between the diameter of a cross section of the hollow space of pipe-shaped member 31 and the diameter of a cross section of cell 40 (including an insulation sheet when the cell is covered with the insulation sheet) to be accommodated in the hollow space is preferably 0.01 mm to 0.38 mm. An excessively large clearance is not preferable because it results in the accommodated cell failing to achieve efficient heat diffusion. On the other hand, an excessively small clearance may result in failure to successfully accommodate a cell in the hollow space.

Any method can be employed for fabricating pipe-shaped members 31 illustrated in FIGS. 2A to 2D. One exemplary method of obtaining pipe-shaped member 31 is a drawing process. It is however difficult to fabricate thin wall pipe-shaped member 31 by the drawing process. Thus, the fabrication method illustrated in FIGS. 4A and 4B may be employed instead. Specifically, metal plate 200 may be bent to form mating surfaces 35 (FIG. 4A) followed by joining mating surfaces 35 (FIG. 4B) to fabricate pipe-shaped member 31. By "mating surfaces 35" is meant opposing edges of, for example, a single metal plate 200 bent into a pipe shape. Means of joining at mating surfaces 35 may be metal joining or the like, and laser joining by means of laser 220 is preferable.

[Relationship Between Method of Joining Mating Surfaces and Protrusion]

Figure 4A:
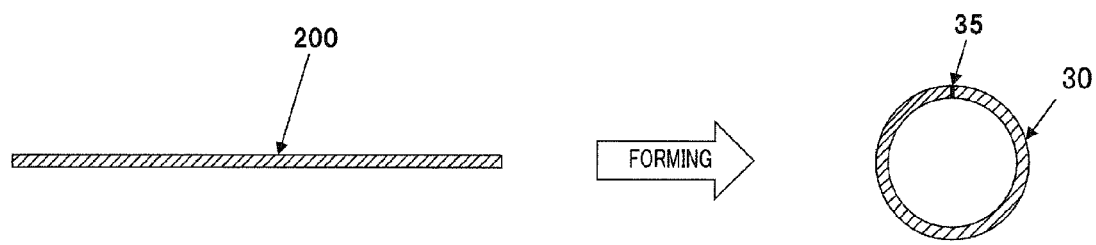
FIGS. 4A and 4B are explanatory views of an exemplary method for obtaining a pipe-shaped member.
Figure 4B:
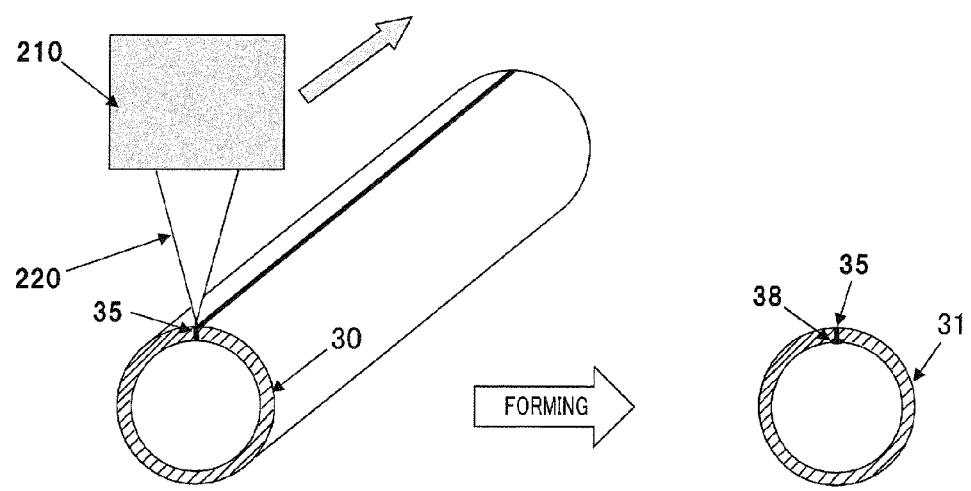

Pipe-shaped member 31 obtained by the fabrication method illustrated in FIGS. 4A and 4B may have, for example, protrusion 38 at mating surfaces 35 on the inner surface of the hollow space of the pipe, as with pipe-shaped members 311, 312 illustrated in FIG. 2C and FIG. 2D. Protrusion 38 is preferably, but no particularly limited to, a protrusion that results from joining (e.g., laser joining) at mating surfaces 35. The relationship between the joining method and protrusion 38 will now be described with reference to FIGS. 4A and 4B.

As illustrated in FIG. 4A, metal plate 200 can be bent into a pipe shape to provide pipe-shaped member (pipe-shaped metal plate) 30 whose edges are not joined. It is to be noted that the method for manufacturing pipe-shaped member (pipe-shaped metal plate) 30a whose edges are not joined is not particularly limited to the above-described method.

Next, as illustrated in FIG. 4B, laser light 220 is directed from laser irradiation head 210 to mating surfaces 35 of pipe-shaped metal plate 30 to effect metal joining to provide pipe-shaped member 31. Although laser welding is exemplified in FIG. 4B, any means of metal joining can be employed; for example, resistance welding, ultrasonic welding, TIG welding or the like may be employed. To effect metal joining, the edges of the metal plate are preferably in close contact with each other at mating surfaces 35. When mating surfaces 35 which are brought in close contact with each other are joined together by metal melting, a protrusion called "weld protrusion" may be formed. By actively forming such a weld protrusion, a protrusion is formed on the inner surface of the hollow space.

The height of protrusion 38 at mating surfaces 35 of pipe-shaped member 311, 312 (see FIGS. 2C and 2D) is preferably determined according to the difference (clearance) between the diameter of a cross section of the hollow space of the pipe-shaped member and the diameter of a cross section of the cell (including an insulation sheet when the cell is covered with the insulation sheet) to be accommodated in the hollow space; for example, the height is set larger than the clearance. The target height of protrusion 38 may be set equal to or larger than "the sum of the clearance and ⅕ of the thickness of the insulation sheet covering the cell" and equal to or less than "the sum of the clearance and ⅓ of the thickness of the insulation sheet covering the cell." Protrusion 38 brings about an effect of limiting vibration and/or rotation of the cell accommodated in the hollow space of pipe-shaped member 31.

Figure 5A:
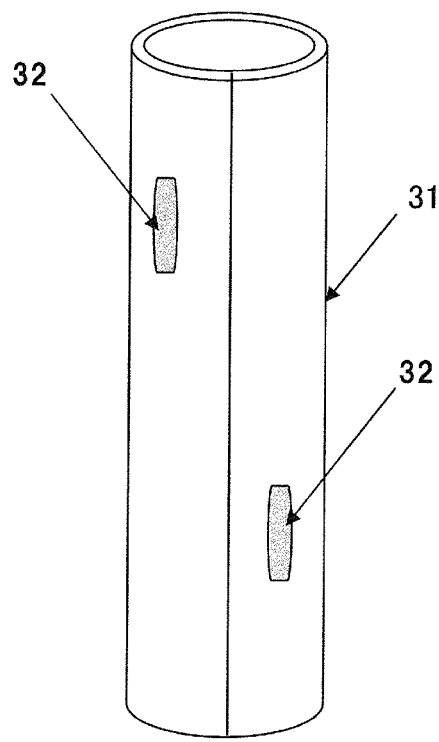
FIG. 5A illustrates a pipe-shaped member having through-holes.
Figure 5B:
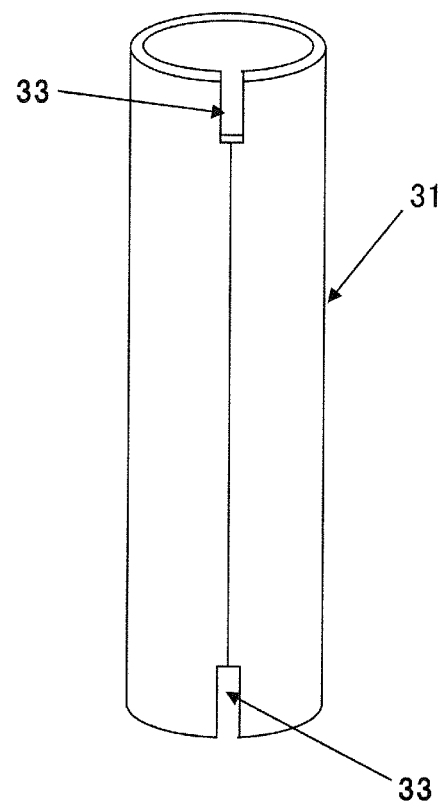
FIG. 5B illustrates a pipe-shaped member having cutouts.

Pipe-shaped member 31 may include through-hole 32 in a part of its side surface as illustrated in FIG. 5A. Moreover, as illustrated in FIG. 5B, pipe-shaped member 31 may include cutouts 33 at its lengthwise ends. Through through-hole 32 or cutout 33, an external member (e.g., temperature sensor) can be connected to the cell (not shown) accommodated inside pipe-shaped member 31.

Figure 6A:
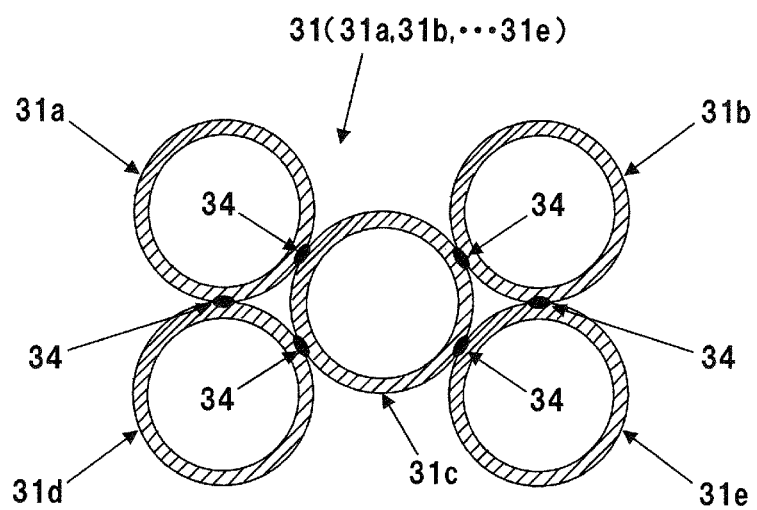
FIGS. 6A to 6C illustrate positions of joints of a plurality of pipe-shaped members constituting a metallic case.

As described above, the metallic case constituting a battery block includes the above-mentioned plurality of pipe-shaped members 31. The plurality of pipe-shaped members 31 constituting the metallic case are in direct contact with each other and are joined together to form a single unit. Specifically, pipe-shaped members 31 are joined together at joints 34 on their side surface to form a single unit (FIG. 6A).

Figure 6B:
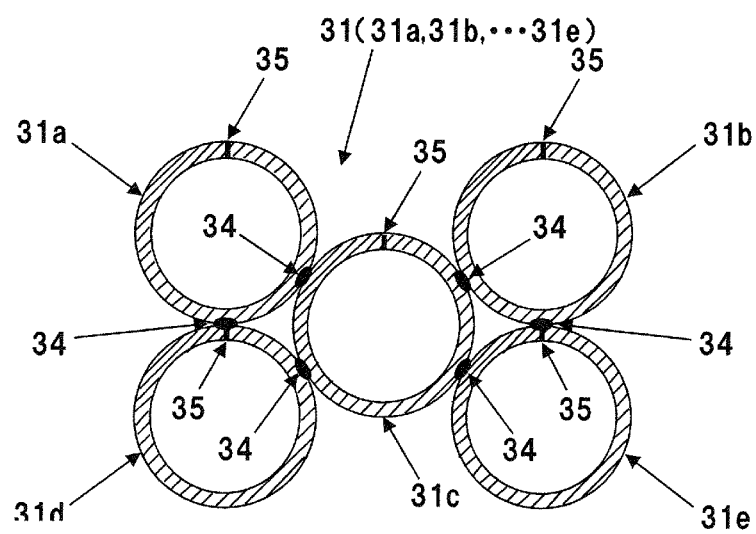
Figure 6C:
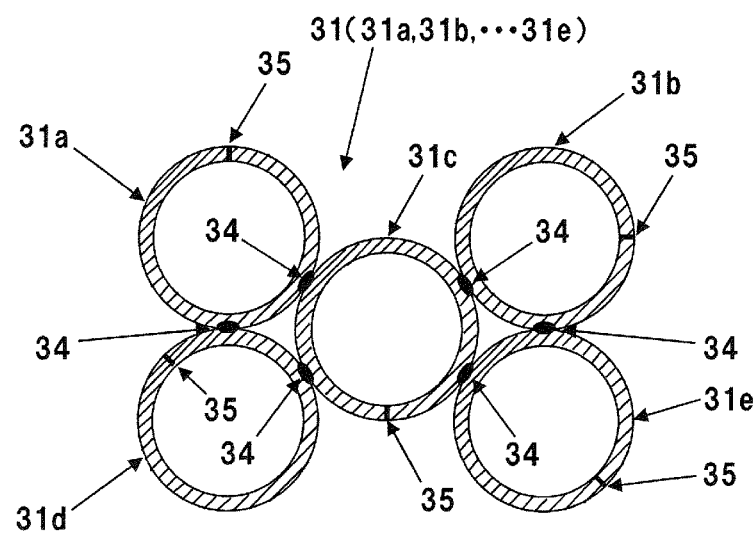

In the metallic case, a plurality of pipe-shaped members 31 (31a, 31b . . . 31e) having mating surfaces 35 may be regularly disposed such that mating surfaces 35 are oriented in the same direction as illustrated in FIG. 6B or may be disposed such that mating surfaces 35 are oriented in random directions as illustrated in FIG. 6C.

Joining of pipe-shaped members 31 that constitutes the metallic case is preferably effected by means of metal joining or the like. Examples of metal joining include brazing, diffusion joining, and welding, with welding being more preferable. Welding includes laser welding, resistance welding, ultrasonic welding, and TIG welding, with laser welding being preferable. For example, a plurality of pipe-shaped members 31 is held together while being in direct contact with each other to form an assembly, and then the pipe-shaped members are joined together at contact parts to form joints 34 (FIG. 6A).

Figure 7:
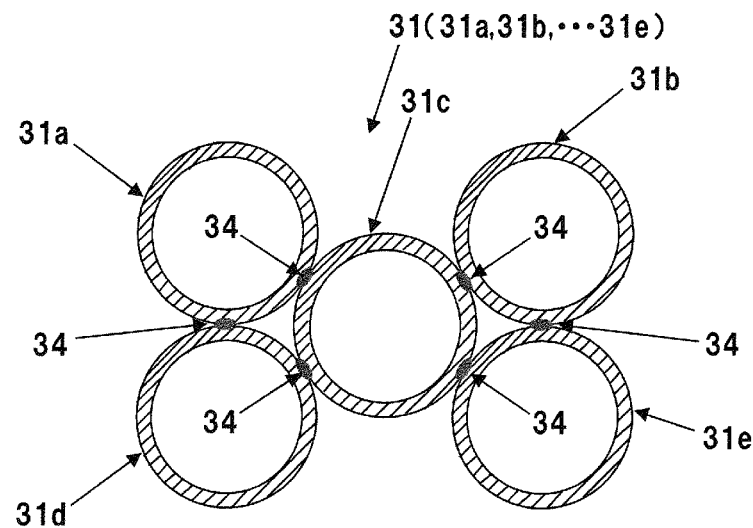
FIG. 7 is an explanatory view of joints between pipe-shaped members constituting a metallic case.
Figure 7:
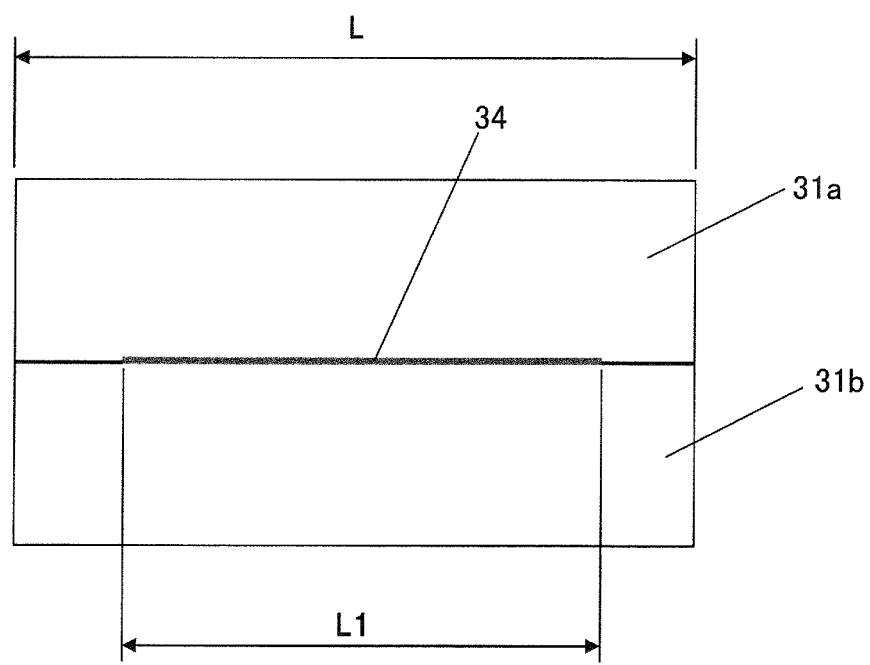

As illustrated in FIG. 7, length L1 of joint 34 between pipe-shaped members is desirably at least 70% of entire length L of pipe-shaped member 31. As described above, when length L1 of joint 34 is at least 70% of entire length L of pipe-shaped member 31, heat generated due to abnormal heat generation in the cell (due for example to short-circuit within the cell) can be diffused to adjacent pipe-shaped members. It is thus made possible to limit a local temperature rise thus preventing a chain reaction of cell degradation and/or cell abnormality (see Experimental Examples set forth later).

The joint illustrated in FIG. 7 is provided as a single joint at the central part of the entire length of pipe-shaped member 31. The mode of joint is not particularly limited to the illustrated one. For example, the joint may be a single joint that extends from one end of pipe-shaped member 31 illustrated in FIG. 7. Alternatively, the joint may be composed of a single linear joint or may be composed of a plurality of linear or spot joints. In either case, the total length of joints (joint length L1) may be 70% of entire length L of pipe-shaped member 31.

Figure 8:
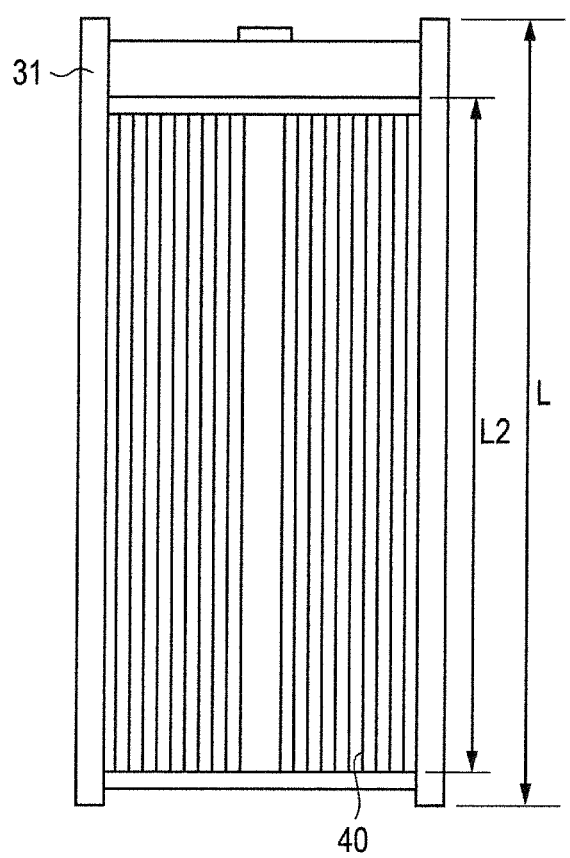
FIG. 8 illustrates a state where a cell is accommodated in a pipe-shaped member.

Joint length L1 may be 100% of entire length L of the pipe-shaped member and is typically less than 100% of entire length L of the pipe-shaped member. As illustrated in FIG. 8, entire length L2 of the cell accommodated in the pipe-shaped member is smaller than entire length L of the pipe-shaped member, and is approximately 95% or less, often 91% or less, of entire length L of the pipe-shaped member. If abnormal heat generation occurs in a cell, the possible site of abnormal heat generation is within entire length L2 of the cell. Thus, heat can be diffused to adjacent pipe-shaped members as long as a joint having a length equals to entire length L2 of the cell is formed, thus eliminating the need to join the pipe-shaped members over their entire length L. By "entire length L2 of cell" is meant a length of a laminate (or roll) of an anode plate, a separator, and a cathode plate.

There are cases where laser joining of pipe-shaped members over entire length L is difficult. Laser joining of ends of pipe-shaped members results in laser light being directed to portions other than the joint being formed, as well as in reflection of the laser light. The reflected laser light may damage the laser apparatus or other equipment. Thus, joint length L1 is preferably 95% or less of entire length L of the pipe-shaped member.

Cells are accommodated in respective pipe-shaped members 31 (31a, 31b . . . ) of a metallic case obtained by metal joining of pipe-shaped members 31. Further, additional battery members are added to manufacture a battery block. The cells are typically covered with a metallic case and may further be covered with an insulation sheet. The insulation sheet is typically a resin film which is 45 μm to 75 μm in thickness.

[Method for Manufacturing Battery Block]

An exemplary method of the present invention for manufacturing a battery block (metallic case) will now be described with reference to FIGS. 9A, 9B and 10.

Figure 9A:
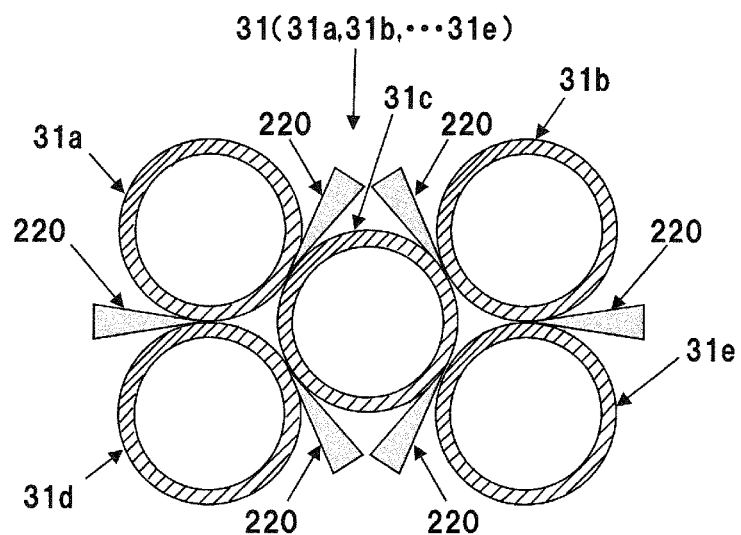
FIGS. 9A and 9B illustrate an example of a manufacturing flow of a metallic case of a battery block.

First, as illustrated in FIG. 9A, a plurality of pipe-shaped members 31 (31a, 31b, . . . and 31e) is assembled and is then joined together by directing laser 220 to contact parts between the pipe-shaped members. In this way, as illustrated in FIG. 9B, a metallic case is obtained which is an assembly of pipe-shaped members 31 (31a, 31b . . . 31e) joined together at joints 34.

Figure 9B:
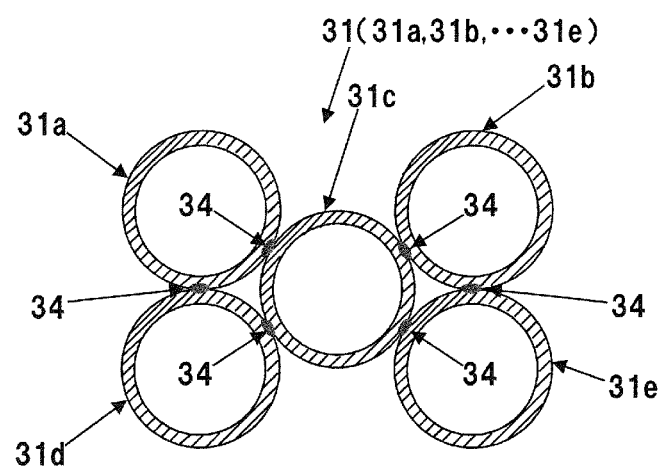
Figure 10:
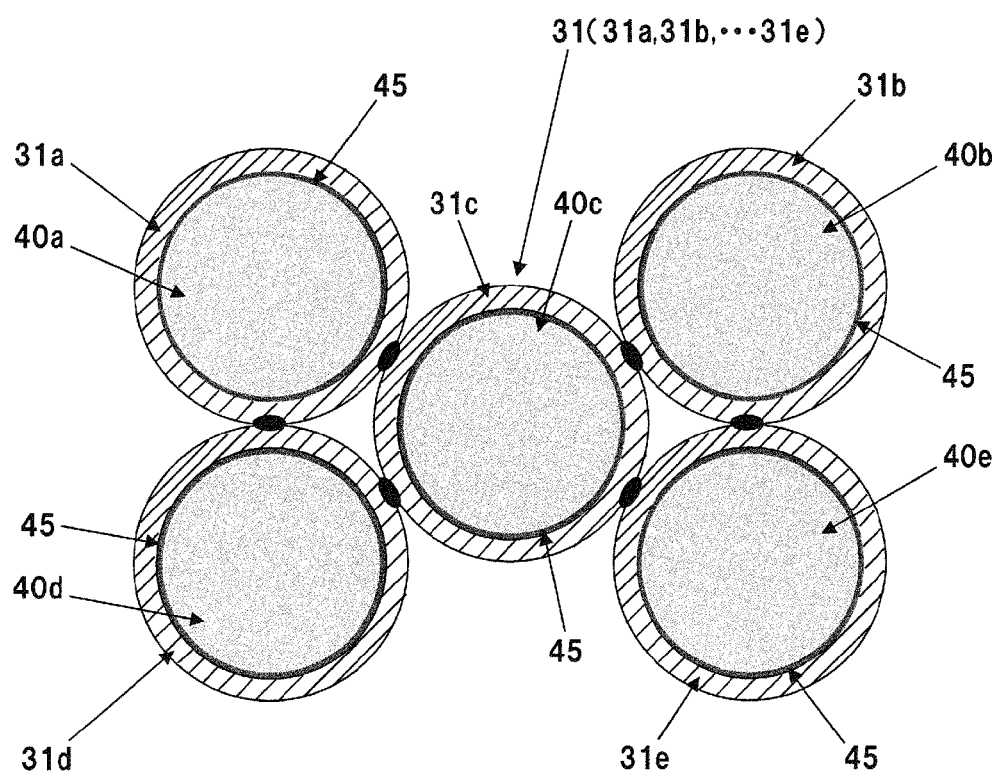
FIG. 10 illustrates an exemplary state where a plurality of cells is accommodated in a metallic case.

Further, as illustrated in FIG. 10, cells 40 (40a, 40b . . . 40e) are accommodated in respective pipe-shaped members 31 (31a, 31b . . . 31e) of the metallic case of FIG. 9B. Subsequently, necessary battery members are added. In the manner described above, a battery block is manufactured. It is to be noted that cell 40 may include insulation sheet 45 covering cell 40.

EXPERIMENTAL EXAMPLES

Two cylindrical aluminum pipes (inner diameter: 18.2 mm, length: 70 mm, and wall thickness: 0.4 mm) were provided.

The two aluminum pipes were joined together. Joining was effected by laser welding in Experimental Examples 1 to 4, by flux joining in Experimental Example 5, and by means of an adhesive in Experimental Example 6.

In Experimental Example 1, the lengthwise central 50 mm part of the contact part between the two cylindrical aluminum pipes was subjected to laser welding. Similarly, the lengthwise central 25 mm part was subjected to laser welding in Experimental Example 2, the lengthwise central 12.5 mm part in Experimental Example 3, and the lengthwise ends in Experimental Example 4.

The types of the method of joining two cylindrical pipes and the states of joint (joint length, ratio of joint length, joint width, and joint area) are summarized in Table 1.

TABLE 1

|  | Joining method | Joint length | Joint ratio | Joint width | Joint area |
|---|---|---|---|---|---|
| Ex. 1 | Laser | 50 mm | 71% | 1 mm | 50 mm$^2$ |
| Ex. 2 | Laser | 25 mm | 36% | 1 mm | 25 mm$^2$ |
| Ex. 3 | Laser | 12.5 mm | 18% | 1 mm | 12.5 mm$^2$ |
| Ex. 4 | Laser | Two ends |  |  | 1.2 mm$^2$ |
| Ex. 5 | Flux | 70 mm | 100% | 3 mm | 210 mm$^2$ |
| Ex. 6 | Adhesive | 70 mm | 100% | 3 mm | 210 mm$^2$ |

Figure 11:
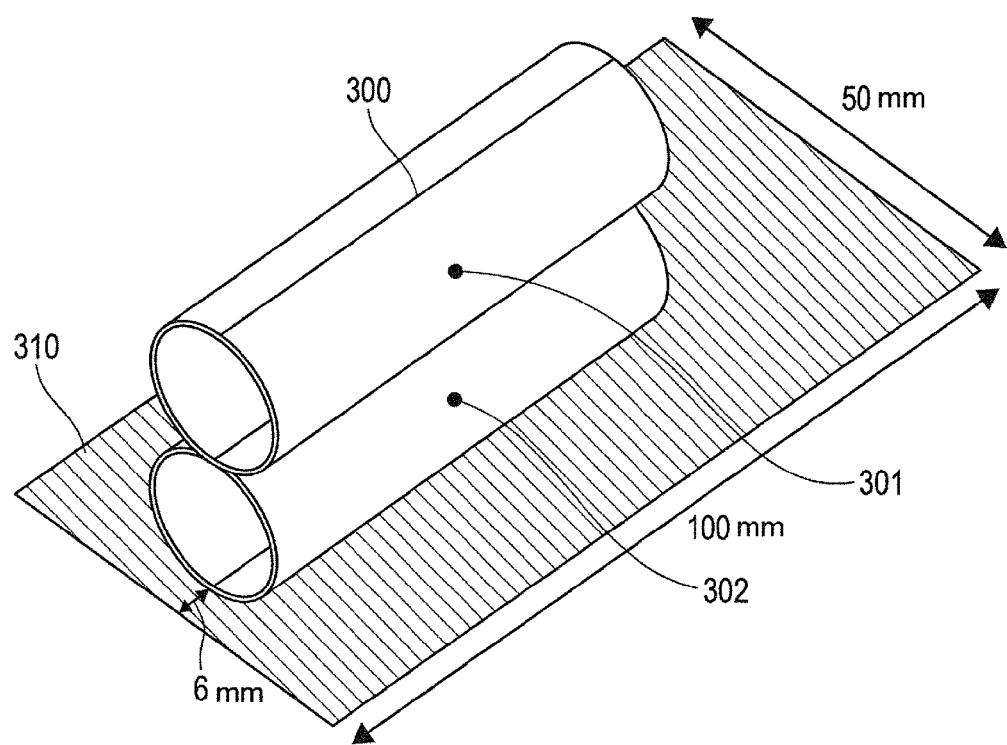
FIG. 11 illustrates a state where pipe-shaped members are placed on a planar heater in Experimental Examples.

As illustrated in FIG. 11, two aluminum pipes 300 joined together were placed on planar heater 310 (50 mm×100 mm) in air atmosphere. Surface heat generation amount of planar heater 310 was set to 1,900 W/m$^2$. The temperatures of two pipes 300 were measured at measurement points 301, 302 positioned at the respective center points, and a temperature difference ΔT was found. From temperature difference ΔT, thermal resistivity R between two aluminum pipes 300 was found. From thermal resistivity R, thermal resistivity R' per unit area of joint was found.

TABLE 2

|  | Temperature difference ΔT | Thermal resistivity R | Thermal resistivity R' |
|---|---|---|---|
| Ex. 1 | 6.3° C. | 0.36 × 10$^{-4}$ m$^2$K/W | 9.29 × 10$^{-6}$ m$^2$K/W |
| Ex. 2 | 6.5° C. | 0.53 × 10$^{-4}$ m$^2$K/W | 7.24 × 10$^{-4}$ m$^2$K/W |
| Ex. 3 | 7.9° C. | 1.93 × 10$^{-4}$ m$^2$K/W | 1.32 × 10$^{-5}$ m$^2$K/W |
| Ex. 4 | 12.0° C. | 6.46 × 10$^{-4}$ m$^2$K/W | 4.24 × 10$^{-6}$ m$^2$K/W |
| Ex. 5 | 6.2° C. | 0.39 × 10$^{-4}$ m$^2$K/W | 3.90 × 10$^{-5}$ m$^2$K/W |
| Ex. 6 | 10.0° C. | 4.77 × 10$^{-4}$ m$^2$K/W | 4.88 × 10$^{-4}$ m$^2$K/W |

As seen from Table 2, the temperature difference decreased with increasing length of the joint formed by laser joining (i.e., with increasing joint ratio). It can also be seen that the temperature difference in Experimental Example 1 and the temperature difference in Experimental Example 5 were almost equal. These results confirm that setting the joint length ratio to at least 70% provides thermal resistivity R which is comparable to a level attained when the joint length ratio is set to 100%. On the other hand, the temperature difference was large in Experimental Example 6 wherein the two aluminum pipes were joined together with an adhesive.

Thermal resistivity R' per unit area of joint was 9.29×10$^{-6}$ m$^2$K/W in Experimental Example 1 and 3.90×10$^{-5}$ m$^2$K/W in Experimental Example 5. Namely, it can be seen that laser joining resulted in small thermal resistivity R' per unit area of joint compared to flux joining Thus, joining is preferably effected by laser welding.

Next, operations and effects of the method of the present invention for manufacturing a battery block in comparison with the conventional manufacturing method will be described. There are cases wherein conventional metallic cases for battery blocks are manufactured as cast metal. The raw material of a mold for casting is sand and thus the mold has high surface irregularities. Therefore, the resultant metallic case or metal cast has small dimensional precision in portions where cells are to be accommodated. Moreover, when casting an aluminum case, variation in the components of aluminum melt and the like occasionally leads to generation of blow holes in the metal cast. Thus, the metallic case manufactured as metal cast needs to be subjected to secondary processing in which to increase the dimensional precision in portions where cells are to be accommodated. Moreover, it is difficult to remove blow holes from the metal cast.

Another known method for manufacturing a metallic case for battery blocks involves arranging a plurality of pipe-shaped members for cells in a predetermined pattern, and joining together adjacent ones of the pipe-shaped members at several points. However, since adjacent pipe-shaped members are joined together at only several points, it is difficult with this method to rapidly equalize the cell temperature distribution and to diffuse heat generated due to abnormal heat generation (due for example to short-circuit within the cell) in the cell. It is therefore difficult to limit a local temperature rise so that a chain reaction of cell degradation and/or cell abnormality is prevented.

By contrast, the method of the present invention for manufacturing a battery block can easily and inexpensively provide a battery block whose dimensional precision is ensured in portions where cells are accommodated. Moreover, the manufacturing method of the present invention can rapidly equalize the cell temperature distribution and to diffuse heat generated due to abnormal heat generation in the cell (due for example to short-circuit within the cell). It is therefore possible to limit a local temperature rise so that a chain reaction of cell degradation and/or cell abnormality is prevented.

The battery block of the present invention can limit vibration of accommodated cells. Also, a limited local temperature rise by means of heat diffusion prevents the performance of the battery block as a storage battery from being easily impaired. Moreover, the battery block is light weight and compact. Block battery applications that can make use of these features are storage batteries to be mounted on automobiles.

INDUSTRIAL APPLICABILITY

The battery block of the present invention includes a plurality of cells and a metallic case for accommodating the cells, wherein the metallic case has high dimensional precision in portions where the cells are accommodated. Thus, vibration of the accommodated cells can be limited thus enabling the cells to properly exert their function. Moreover, the metallic case can be manufactured easily as well as at low cost.

REFERENCE SIGNS LIST

10 Electrode plate
20 Holder
30a Pipe-shaped metal plate
31, 31a Pipe-shaped member
311 Circular Pipe
312 Polygonal Pipe
32 Through-hole
33 Cutout
34 Joint
35 Mating surface
38 Protrusion 40 Cell
41 Electrode
42 Electrode
45 Insulation sheet covering cell
50 Holder
60 Electrode plate
100 Battery block
200 Metal plate
210 Laser irradiation head
220 Laser light
300 Aluminum pipe
301,302 Measurement point
310 Planar heater

The invention claimed is:

1. A battery block comprising:
a metallic case including a plurality of pipe-shaped members; and
cells respectively accommodated in the plurality of pipe-shaped members,
wherein the pipe-shaped members are joined together to form a single unit, and a length of a joint between adjacent ones of the pipe-shaped members is 70% to 95% of an entire length of the pipe-shaped members.

2. The battery block according to claim 1, wherein joining of the adjacent ones of the pipe-shaped members is metal joining.

3. The battery block according to claim 1, wherein joining of the pipe-shaped members is welding.

4. The battery block according to claim 1, wherein joining of the pipe-shaped members is laser welding.

5. The battery block according to claim 1, wherein each of the pipe-shaped members is made of aluminum, copper, brass, or stainless steel.

6. The battery block according to claim 1, wherein each of the pipe-shaped members is a circular pipe or a polygonal pipe.

7. A method for manufacturing a battery block comprising:
providing an assembly of a plurality of pipe-shaped members by holding together the pipe-shaped members while being in direct contact with each other; and
providing a metallic case by laser joining of contact surfaces of the pipe-shaped members such that a length of a joint between the pipe-shaped members is 70% to 95% of an entire length of the pipe-shaped members.

8. The method according to claim 7, further comprising accommodating a cell in a hollow space of each of the pipe-shaped members of the metallic case.

\* \* \* \* \*